Sept. 8, 1959          B. WEMPE                2,903,559
                   TORCH FOR ARC-WELDING
                    Filed Dec. 21, 1953
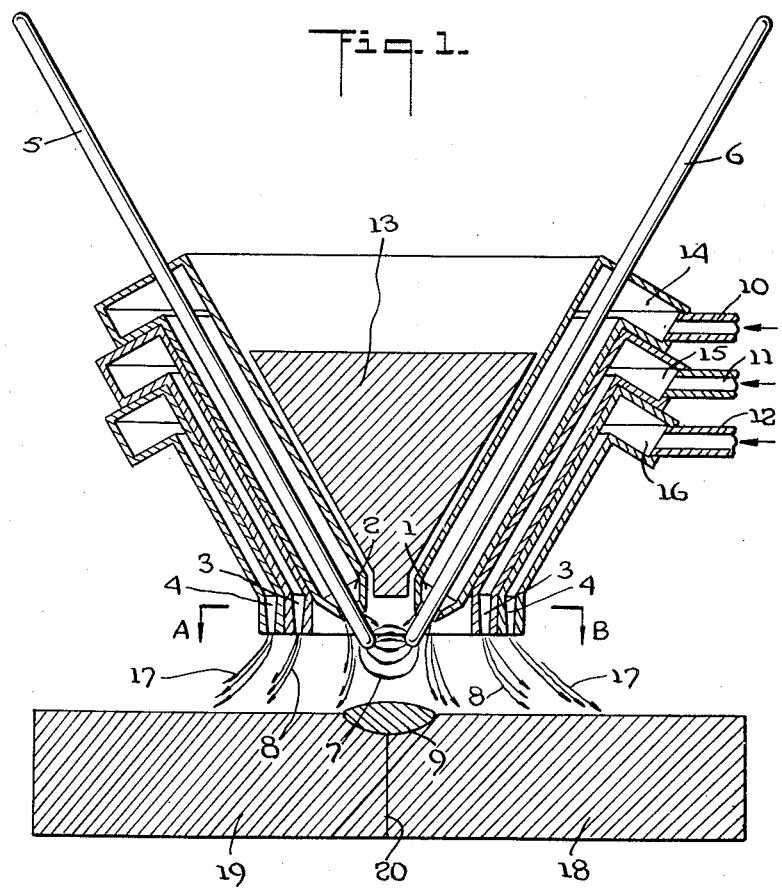
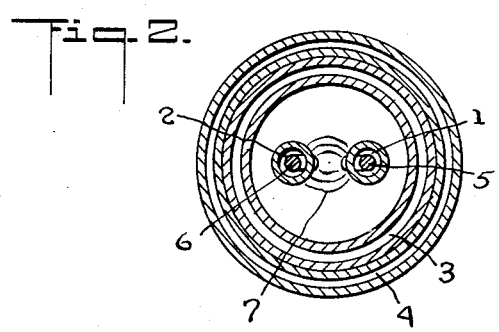
INVENTOR.
BERNHARD WEMPE
BY
ATTORNEY

United States Patent Office

2,903,559
Patented Sept. 8, 1959

2,903,559

TORCH FOR ARC-WELDING

Bernhard Wempe, Mullheim, Baden, Germany

Application December 21, 1953, Serial No. 399,458

1 Claim. (Cl. 219—75)

This invention relates to an improved welding method, and more particularly to a method of welding by means of atomic hydrogen or noble gases, especially argon, and to a welding torch especially adapted to carry out such improved welding method.

It is known to weld or fuse, respectively, metals, oxides and the like by means of atomic hydrogen. Such welding usually is accomplished by means of a torch consisting, in principle, of two tungsten electrodes which are arranged in such a manner that each electrode is surrounded by and exposed to a hydrogen atmosphere. The hydrogen is discharged from a nozzle concentrically surrounding said electrodes. Thereby, said hydrogen is blown into the electric arc produced between said electrodes while the electrodes are exposed to the surrounding free atmosphere. Since the torch is manually operated by the welder, one has to work in the above described manner and must use a torch of the above given design. The torch tips or heads of welding devices as they are conventionally used, vary considerably in their design. Usually welding torches are employed wherein the electrodes are arranged at an angle of 30° to 60°, and hydrogen is supplied to the electric arc by nozzles concentrically arranged around said electrodes. There are also known welding torches having a single centrally arranged nozzle from which hydrogen is blown into the electric arc. Said nozzle is surrounded by another nozzle from which hydrogen is also discharged. The velocity of flow and the pressure of hydrogen discharged from said second nozzle are lower than the velocity of flow and the pressure of the gas discharged from the nozzle centrally arranged around the electrodes. From said centrally arranged nozzle hydrogen is discharged with a much higher speed and at considerably higher pressure. By such an arrangement of two nozzles, both discharging hydrogen but with different velocity of flow and under different pressure, a considerable saving in said hydrogen is achieved.

It has been found, however, that it is not possible to produce prefectly welded joints in a consistently reliable manner by using torches of the above described design, because the electric arc, although initially protected by hydrogen, actually burns in the surrounding air. Thereby the hydrogen itself burns, at least partly, on contact with air and forms thereby water vapors. Said water vapors are capable of entering the region around the electric arc due to diffusion and turbulence. The vapors dissociate in the electric arc and form elementary hydrogen and elementary oxygen, i.e. gases which, under such conditions, are highly reactive. Hence, a gas atmosphere consisting of hydrogen, water vapor, oxygen, and nitrogen is present at the surface of the piece to be welded, said gases widely differing from each other in their reactivity and energy contents. Presence of oxygen, of course, will unfavorable affect the quality of the welding seam and, furthermore, will also hinder proper manipulation of the burner. Thus, it is known that it is not possible to properly weld by said heretofore used torches, in thicker layers, rods of chromium-nickel alloys of large diameter, especially rods consisting of alloys with a chromium content of 15% to 30%. Very often pockets of slag are formed in the welded joint and the ductibility and strength properties are not uniform throughout the weld and do not meet the requirements with regard to its desired mechanical strength.

It is one object of this invention to provide a method of arc-welding with atomic hydrogen which method operates in such a manner that any generation of water vapors and, thus, presence of oxygen in the electric arc is avoided.

Another object of this invention consists in providing an improved torch for welding with atomic hydrogen which prevents any generation of water vapors in the electric arc and, therefore, insures welding in the absence of oxidizing gases.

Other objects of this invention will become apparent as the specification proceeds.

In principle, the invention consists in fully protecting the gas atmosphere conventionally surrounding the electrodes and usually consisting of hydrogen, against any oxidation by providing a further protective non-oxidizing, non-combustible gas atmosphere around said hydrogen atmosphere. To carry out such a mode of operation, a welding torch is used which is not only provided with means for producing a hydrogen atmosphere around the electric arc but, additionally thereto, with means for supplying a protective gas preventing oxidation of said inner hydrogen atmosphere. As outer protective gas there is used a gas which is not oxidized and non-combustible under the conditions prevalent during welding. Nitrogen, carbon dioxide, and noble gases are employed with advantage as such protective gases. Compounds which inhibit oxidation, may also be added thereto. Such oxidation inhibiting compounds are, for instance, carbon tetrachloride and others.

The present invention comprises a welding method whereby the protective gas itself is surrounded by a further protective gas atmosphere. This is of great advantage when using the expensive but very efficient noble gases for protecting the hydrogen atmosphere around the electric arc, and will reduce the amount of noble gas required which is rather expensive. When proceeding in this manner the protective gas atmosphere surrounding the hydrogen and the electrodes as well as the joint to be welded need by only of limited depth and is itself protected by a surrounding outer atmosphere of more inexpensive readily available protective gases, preferably of carbon dioxide. Said outermost gas atmosphere may contain water vapors which are prevented, by the intermediate protective gas layer, from coming into contact with the innermost hydrogen atmosphere, the electrodes, and the joint to be welded.

It is advantageous to admix to the innermost hydrogen atmosphere a volatile hydrocarbon, such as propane, in small amounts in order to prevent decarbonization of the electrodes. As is well known, pure hydrogen very rapidly and easily decarbonizes steel having a high carbon content.

The new method of welding is not only of advantage when using hydrogen as the innermost gas atmosphere but also when welding in noble gas atmosphere, especially in an argon atmosphere. It has been found that about 40% of noble gas is saved with the heretofore used argon welding process without protective nitrogen cover. When flash welding, for instance, according to the so-called Sigma process, an even greater saving in noble gas is achieved. In contrast to the term "protective gas" for the outer gas zones, the term "welding gas" will be used herein and in the claims annexed hereto in order to designate the innermost gas atmosphere surrounding the electrodes and consisting of hydrogen, noble gases, especially argon, and mixtures thereof.

The new method of arc-welding by means of atomic hydrogen according to this invention has many advantages over the known methods. For instance, while heretofore it was not possible to weld aluminum alloys without using a flux, this can be done without any difficulty when welding according to the present invention. It is, furthermore, possible to weld chromium-nickel steel rods of 30 mm. to 40 mm. diameter and of a chromium content of 20% whereby the strength of the welded rod is reduced to only 15% to 18% and its elongation value is 50% to 65%. The new method permits, for instance, to maintain in the liquid state a small area of a chromium-nickel steel piece for a longer period of time, such as for 5 minutes and more, without any oxidation of the chromium.

Since the general construction and many of the details in torches for welding with atomic hydrogen and/or noble gases, such as argon, are known and familiar to those skilled in the art, it is only necessary for an understanding of this invention to illustrate and describe so much of such a torch as will disclose the present invention. It will be understood that in this disclosure many details of constructions are omitted as unnecessary and as interfering with a consideration of the embodiment of the invention, and will be readily supplied by those skilled in the art.

A preferred embodiment of this invention is illustrated in the attached drawings. It is, of course, understood that the method of the invention is not limited to the precise structure torch shown and described more in detail hereinafter, as the invention, as defined in the appended claim, can be embodied in a plurality and variety of forms and can be practiced in a plurality and variety of ways.

Fig. 1 is a vertical cross-sectional view of a torch according to this invention.

Fig. 2 is a cross-sectional view of the nozzle of said torch along the line A—B of Fig. 1.

In these figures identical reference characters indicate corresponding parts in all the views.

The torch according to this invention and illustrated in Figs. 1 and 2 comprises nozzles 1 and 2 for hydrogen which is discharged with a high speed through said nozzles and which concentrically surrounds two tungsten electrodes 5 and 6 arranged at an angle of about 60° to each other. Electric arc 7 is formed between said two electrodes on welding with said torch, said electric arc drawn in pure hydrogen discharged from said nozzles 1 and 2. Nozzle 3 surrounds concentrically said electrodes 5 and 6 and said nozzles 1 and 2. Nitrogen or a noble gas, such as helium, respectively, is discharged through said nozzle 3 and produces a non-combustible protective gas zone 8 around electric arc 7 with its hydrogen atmosphere. Said nitrogen or noble gas zone 3, respectively, serves as protective gas to prevent access of air to said electric arc and formation of water and, under the influence of said electric arc, dissociation of said water to oxygen. Nozzle 4 is arranged concentrically around said nozzle 3 and electrodes 5 and 6 with their nozzles 1 and 2. A protective gas is passed through said nozzle 4 creating a second protective zone 17 around electric arc 7 with its hydrogen atmosphere. Preferably the protective gas in said second protective zone 17 is carbon dioxide or a carbon dioxide containing gas. Nozzles 1 and 2 are connected with a hydrogen supply, such as a hydrogen cylinder, by annular duct 14 and feed pipe 10. Nozzles 3 and 4 are likewise connected with a nitrogen cylinder or a carbon dioxide cylinder, respectively, by annular ducts 15 and 16, respectively, and feed pipes 11 and 12, respectively. The two electrodes 5 and 6 with their surrounding hydrogen supply nozzles 1 and 2 are insulated from each other and maintained at the desired angle by insulating element 13. The metal pieces 18 and 19 are welded together at joint 20 whereby part of said metal pieces 9 is in the molten state due to the fusing effect of the electric arc 7. It is evident that this molten joint 9 is completely protected against the access of air not only by the hydrogen atmosphere of electric arc 7 but by the two protective gas zones 8 and 17 concentrically surrounding said electric arc 7.

A further embodiment of this invention comprises a method whereby an electric arc is formed not only between the two tungsten electrodes but additionally also between said two electrodes and the work piece which is also connected with the electric circuit. Such an arrangement permits not only welding with atomic hydrogen but also, especially when argon is admixed to the hydrogen, partial transfer of energy by the electric arc instead of by atomic hydrogen.

Excellent results are also achieved by another advantageous embodiment of this invention whereby only one electrode is provided and the workpiece is connected as the second electrode, i.e., whereby an electric arc is drawn between said electrode and the workpiece. In this method, the electric arc burns in a noble gas atmosphere and, preferably, in an argon atmosphere. In place of argon or in mixture therewith, other noble gases and, especially, helium may be used. The noble gases may also be mixed with hydrogen. According to the present invention said noble gas zone is separated from the surrounding atmosphere by the protective gas zones. Nitrogen and/or carbon dioxide have proved to be especially suitable protective gases. Carrying out the above described process of welding in a noble gas atmosphere which is surrounded by a protective gas atmosphere results in a saving of at least 50% to 60% of the rather expensive noble gas employed.

The new method of welding by means of atomic hydrogen and/or noble gases according to the present invention is used with great advantage in all instances where it is essential to produce welded joints in work pieces which are subjected to considerable strain and stress. This new welding method is advantageously used, for instance, for welding blades to blade wheels of turbines, turbo-jet engines, turbine-driven air and gas compressors, in making combustion chambers of gas turbines, for producing clad sheets by welding, such as they are used in the chemical industry, and for many other purposes.

It is, of course, understood that the new welding method is not limited to manually operated torches but may just as well be performed by means of welding machines, which automatically move the arc along the joint to be welded, feed the electrode into the arc, and control the length of the arc. The electrodes may consist, instead of tungsten, of carbon or of metal, said metal electrodes melting during the welding process to form filler metal for the weld.

In principle, it does not make any difference whether direct current or alternating current of high or low frequency is used. When working with alternating current it is, of course, necessary to connect each electrode with the work piece by means of a rectifier.

Of course, many changes and variations, in the addition of compounds inhibiting oxidation of said protective gases, in the arrangement and design of the nozzles surrounding the electrodes, and the like may be made by those skilled in the art in accordance with the principles set forth herein and in the claim annexed hereto.

I claim:

In an electric arc welding apparatus comprising two electrodes arranged to produce an electric arc therebetween: the combination of first nozzle means concentrically surrounding said electrodes, means for supplying to said nozzle means a welding gas selected from the group consisting of hydrogen and noble gases, second nozzle means concentrically surrounding said welding gas nozzle means, means for supplying to said second nozzle means a non-combustible protective gas selected from the group consisting of noble gases when the welding gas is hydrogen and from the group consisting of nitrogen and carbon dioxide when the welding gas is a noble gas, third nozzle means concentrically surrounding the second nozzle means, and means for supplying carbon dioxide to said third nozzle means.

References Cited in the file of this patent

UNITED STATES PATENTS

| | | |
|---|---|---|
| 903,826 | Arsem | Nov. 17, 1908 |
| 1,589,017 | Lincoln | June 15, 1926 |
| 1,717,530 | Thomson | June 18, 1929 |
| 1,916,014 | Palmer | June 27, 1933 |
| 1,933,343 | Sandelowsky | Oct. 31, 1933 |
| 1,947,267 | Langmiur | Feb. 13, 1934 |
| 2,011,872 | Rava | Aug. 20, 1935 |
| 2,053,417 | Brace | Sept. 8, 1936 |
| 2,497,631 | Rothschild | Feb. 14, 1950 |
| 2,522,482 | Olzak | Sept. 12, 1950 |
| 2,544,711 | Mikhalapov | Mar. 13, 1951 |
| 2,576,793 | Jordan | Nov. 27, 1951 |
| 2,686,860 | Buck et al. | Aug. 17, 1954 |

FOREIGN PATENTS

| | | |
|---|---|---|
| 149,535 | Austria | May 10, 1937 |
| 546,961 | Great Britain | Aug. 7, 1942 |